US007675660B2

(12) United States Patent
Hoshino

(10) Patent No.: US 7,675,660 B2
(45) Date of Patent: Mar. 9, 2010

(54) COLOR ADJUSTMENT METHOD

(75) Inventor: Toru Hoshino, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 922 days.

(21) Appl. No.: 11/442,278

(22) Filed: May 30, 2006

(65) Prior Publication Data

US 2006/0274387 A1    Dec. 7, 2006

(30) Foreign Application Priority Data

Jun. 1, 2005    (JP)    ............................. 2005-161898

(51) Int. Cl.
G02B 5/12    (2006.01)
G06F 15/00    (2006.01)
(52) U.S. Cl. ........................ 358/518; 358/1.9
(58) Field of Classification Search .................. 358/1.9, 358/2.1, 518
See application file for complete search history.

(56) References Cited

U.S. PATENT DOCUMENTS 7,365,878 B2 *    4/2008    Nakagawa ................. 358/1.9
2003/0043394 A1 *    3/2003    Kuwata et al. ............... 358/1.9
2008/0174798 A1 *    7/2008    Cho et al. .................... 358/1.9

* cited by examiner

Primary Examiner—Twyler L Haskins
Assistant Examiner—David L Suazo
(74) Attorney, Agent, or Firm—Finnegan, Henderson, Farabow, Garrett & Dunner, L.L.P.

(57) ABSTRACT

The first color difference between the second color space value showing the second color tone and the first color space value showing the first color tone is found when the first color tone is a target of color adjustment and the second color tone is a output of the target, the first color space value is corrected by a predetermined correction amount, the moved ratio of the predetermined correction amount to a moved amount which is derived from the second color space value and the third color space value showing the third color tone is found when the third color tone is a output of the first color space value with the predetermined correction amount, and the color adjustment is conducted based on the first color space value with a amount obtained correcting the first color difference with the moved ratio.

11 Claims, 13 Drawing Sheets

FIG. 1

| | PRINT (INK) | | | |
|---|---|---|---|---|
| | K | C | M | Y |
| W | — | — | — | — |
| C | — | * | — | — |
| M | — | — | * | — |
| Y | — | — | * | * |
| R(MY) | — | — | — | * |
| G(CY) | — | * | * | * |
| B(CY) | — | * | — | — |
| CMY | — | * | * | * |
| K | * | — | * | — |
| KC | * | * | — | — |
| KM | * | — | * | — |
| KY | * | — | — | * |
| KR(KMY) | * | — | * | * |
| KG(KCY) | * | * | — | * |
| KB(KCM) | * | * | * | — |
| KCMY | * | * | * | * |

FIG. 4

Table 22: Combination of the output intensity

| | | Y | M | C |
|---|---|---|---|---|
| PIXEL a | W | 11 | 17 | 17 |
| | C | 8 | 22 | 95 |
| | M | 23 | 103 | 20 |
| | Y | 79 | 19 | 10 |
| | R(MY) | 62 | 110 | 17 |
| | G(CY) | 69 | 24 | 88 |
| | B(CY) | 29 | 70 | 92 |
| | CMY | 62 | 72 | 90 |
| | K | 61 | 73 | 75 |
| | KC | 68 | 75 | 94 |
| | KM | 73 | 90 | 80 |
| | KY | 81 | 74 | 82 |
| | KR(KMY) | 82 | 92 | 88 |
| | KG(KCY) | 80 | 76 | 100 |
| | KB(KCM) | 74 | 88 | 96 |
| | KCMY | 80 | 87 | 100 |
| PIXEL b | C | | | |
| | M | | | |
| | Y | | | |
| | R(MY) | | | |
| | G(CY) | | | |
| | B(CY) | | | |
| | CMY | | | |
| | K | | | |
| | KC | | | |
| | KM | | | |
| | KY | | | |
| | KR(KMY) | | | |
| | KG(KCY) | | | |
| | KB(KCM) | | | |
| | KCMY | | | |

FIG. 5

Table 23

| BASIC COLOR INTENSITY | | | VALUE OF THE COLOR SPECIFICATION SYSTEM | | |
|---|---|---|---|---|---|
| Y | M | C | L* | a* | b* |
| 0 | 0 | 0 | 90.66 | 0.58 | -1.07 |
| 0 | 0 | 20 | 85.98 | -7.36 | -7.07 |
| 0 | 0 | 40 | 79.48 | -15.81 | -14.04 |
| 0 | 0 | 60 | 72.91 | -23.37 | -22.83 |
| ⋮ | ⋮ | ⋮ | ⋮ | ⋮ | ⋮ |
| 140 | 180 | 180 | 5.91 | 3.62 | -1.87 |

FIG. 6

| COLOR | | % | | | | | | |
|---|---|---|---|---|---|---|---|---|
| | | 0 | 10 | 20 | ..... | 80 | 90 | 100 |
| C | L* | 94.3 | 89.4 | 85.49 | | 61.86 | 57.24 | 53.4 |
| | a* | -0.02 | -4.09 | -6.97 | | -25.28 | -29.14 | -32.43 |
| | b* | 1.18 | -4.94 | -9.92 | | -39.63 | -45.4 | -50.17 |
| | Dc | 0.07 | 0.18 | 0.26 | | 1.02 | 1.29 | 1.64 |
| M | L* | 94.3 | 89.19 | 84.78 | | 57.37 | 52.61 | 49.13 |
| | a* | -0.02 | 6.89 | 12.6 | | 54.83 | 63.49 | 70.11 |
| | b* | 1.18 | -0.32 | -1.04 | | -1.72 | 0.04 | 1.94 |
| | Dm | 0.08 | 0.17 | 0.25 | | 0.99 | 1.23 | 1.48 |
| Y | L* | 94.3 | 93.75 | 93.2 | | 90.26 | 89.87 | 89.61 |
| | a* | -0.02 | -1.5 | -2.45 | | -5.78 | -6.03 | -6.14 |
| | b* | 1.18 | 10.21 | 18.21 | | 68.67 | 78.94 | -88.08 |
| | Dy | 0.09 | 0.16 | 0.24 | | 0.82 | 0.96 | 1.09 |
| K | L* | 94.3 | 92.87 | 92.87 | | 92.87 | 92.87 | 92.87 |
| | a* | -0.02 | -1.47 | -1.47 | | -1.47 | -1.47 | -1.47 |
| | b* | 1.18 | -0.86 | -0.86 | | -0.86 | -0.86 | -0.86 |
| | Dv | 0.08 | 0.21 | 0.31 | | 1.19 | 1.47 | 1.66 |
| R | L* | 94.3 | 88.58 | 83.55 | | 55.68 | 51.18 | 48.26 |
| | a* | -0.02 | 5.65 | 10.71 | | 51.41 | 59.84 | 65.45 |
| | b* | 1.18 | 8.14 | 14.05 | | 39.96 | 43.48 | 45.4 |
| G | L* | 94.3 | 88.98 | 84.62 | | 56.98 | 52.1 | 48.04 |
| | a* | -0.02 | -5.51 | -9.72 | | -44.77 | -54.42 | -64.56 |
| | b* | 1.18 | 4.08 | 6.61 | | 18.63 | 20.99 | 23.5 |
| B | L* | 94.3 | 84.72 | 76.85 | | 35.34 | 28.72 | 23.78 |
| | a* | -0.02 | 2.75 | 5.46 | | 16.62 | 18.05 | 18.07 |
| | b* | 1.18 | -6.19 | -11.16 | | -35.37 | -39.11 | -42.25 |
| CMY | L* | 94.3 | 84.01 | 75.8 | | 32.69 | 26.32 | 21.71 |
| | a* | -0.02 | 1.06 | 2.26 | | 4.46 | 2.01 | -2.25 |
| | b* | 1.18 | 2.14 | 3.47 | | 2.75 | 0.36 | -2.34 |
| KC | L* | | | | | | | |
| | a* | | | | | | | |
| | b* | | | | | | | |
| KM | L* | | | | | | | |
| | a* | | | | | | | |
| | b* | | | | | | | |
| KY | L* | | | | | | | |
| | a* | | | | | | | |
| | b* | | | | | | | |
| KR | L* | | | | | | | |
| | a* | | | | | | | |
| | b* | | | | | | | |
| KG | L* | | | | | | | |
| | a* | | | | | | | |
| | b* | | | | | | | |
| KB | L* | | | | | | | |
| | a* | | | | | | | |
| | b* | | | | | | | |
| KCMY | L* | | | | | | | |
| | a* | | | | | | | |
| | b* | | | | | | | |

| | COLOR | COMPOSITION COLOR | DOT % | | | | |
|---|---|---|---|---|---|---|---|
| | | | 10 | 20 | ..... | 80 | 90 |
| AREA RATIO | C | W | 0.87 | 0.73 | | 0.11 | 0.05 |
| | | Ca | 0 | 0 | | 0.42 | 0.66 |
| | | Cb | 0.13 | 0.27 | | 0.47 | 0.29 |
| | M | W | 0.82 | 0.66 | | 0.1 | 0.05 |
| | | Ma | 0 | 0 | | 0.42 | 0.67 |
| | | Mb | 0.18 | 0.34 | | 0.48 | 0.27 |
| | ⋮ | | | | | | |
| | G | W | 0.71 | 0.46 | | 0 | 0 |
| | | Ca | 0 | 0 | | 0.03 | 0.02 |
| | | Cb | 0.11 | 0.22 | | 0.07 | 0.02 |
| | | Ya | 0 | 0 | | 0.02 | 0.01 |
| | | Yb | 0.16 | 0.27 | | 0.11 | 0.05 |
| | | Ga | 0 | 0 | | 0.35 | 0.6 |
| | | Gb | 0.02 | 0.05 | | 0.41 | 0.3 |
| | B | W | 0.7 | 0.45 | | 0 | 0 |
| | | Ca | 0 | 0 | | 0.03 | 0.02 |
| | | Cb | 0.11 | 0.22 | | 0.07 | 0.02 |
| | | Ma | 0 | 0 | | 0.02 | 0.01 |
| | | Mb | 0.17 | 0.29 | | 0.12 | 0.05 |
| | | Ba | 0 | 0 | | 0.36 | 0.6 |
| | | Bb | 0.02 | 0.05 | | 0.41 | 0.3 |
| | ⋮ | | | | | | |
| | CMYK | W | 0.47 | 0.06 | | 0 | 0 |
| | | Ca | 0 | 0 | | 0 | 0 |
| | | Cb | 0.09 | 0.13 | | 0 | 0 |
| | | Ma | 0 | 0 | | 0 | 0 |
| | | Mb | 0.13 | 0.19 | | 0 | 0 |
| | | Ya | 0 | 0 | | 0 | 0 |
| | | Yb | 0.13 | 0.19 | | 0 | 0 |
| | | Ra | 0 | 0 | | 0 | 0 |
| | | Rb | 0.02 | 0.05 | | 0 | 0 |
| | | Ga | 0 | 0 | | 0 | 0 |
| | | Gb | 0.01 | 0.03 | | 0 | 0 |
| | | Ba | 0 | 0 | | 0 | 0 |
| | | Bb | 0.01 | 0.04 | | 0 | 0 |
| | | CMYa | 0 | 0 | | 0 | 0 |
| | | CMYb | 0 | 0.02 | | 0 | 0 |
| | | Ka | 0 | 0 | | 0 | 0 |
| | | Kb | 0.09 | 0.13 | | 0 | 0 |
| | | KCa | 0 | 0 | | 0 | 0 |
| | | KCb | 0.02 | 0.05 | | 0 | 0 |
| | | KMa | 0 | 0 | | 0 | 0 |
| | | KMb | 0.02 | 0.05 | | 0 | 0 |
| | | KYa | 0 | 0 | | 0 | 0 |
| | | KYb | 0.02 | 0.04 | | 0 | 0 |
| | | KRa | 0 | 0 | | 0.04 | 0.03 |
| | | KRb | 0 | 0.02 | | 0.1 | 0.04 |
| | | KGa | 0 | 0 | | 0.04 | 0.03 |
| | | KGb | 0 | 0.02 | | 0.1 | 0.04 |
| | | KBa | 0 | 0 | | 0.04 | 0.02 |
| | | KBb | 0 | 0.01 | | 0.1 | 0.04 |
| | | KMCYa | 0 | 0 | | 0.16 | 0.4 |
| | | KMCYb | 0 | 0 | | 0.43 | 0.41 |

25

| COLOR PLATE | DOT IMAGE DATA | | | | PIXEL b |
|---|---|---|---|---|---|
| | K | C | M | Y | |
| PIXEL 1 | 0 | 0 | 0 | 0 | 0 |
| PIXEL 2 | 0 | 0 | 0 | 0 | 0 |
| PIXEL 3 | 1 | 0 | 0 | 0 | 1 |
| ⋮ | | | | | |
| PIXEL k | 0 | 1 | 1 | 0 | 1 |
| PIXEL k + 1 | 0 | 0 | 1 | 0 | 0 |
| ⋮ | | | | | |
| PIXEL n | 0 | 0 | 0 | 0 | 0 |

FIG. 10

| 27 | | VALUE OF THE COLOR SPECIFICATION SYSTEM | | |
|---|---|---|---|---|
| | | L* | a* | b* |
| PIXEL a | W | 82.86 | 2.62 | -4.35 |
| | C | 56.24 | -21.23 | -37.04 |
| | M | 50.95 | 50.29 | -5.72 |
| | Y | 78.70 | -3.16 | 58.03 |
| | R(MY) | 48.58 | 48.47 | 19.27 |
| | G(CY) | 51.89 | -38.17 | 11.39 |
| | B(CY) | 38.47 | 5.85 | -28.35 |
| | CMY | 35.57 | -2.42 | -6.50 |
| | K | 37.37 | 1.31 | 1.00 |
| | KC | 32.25 | -2.42 | -4.55 |
| | KM | 31.15 | 8.94 | 0.02 |
| | KY | 34.20 | -1.01 | 6.67 |
| | KR(KMY) | 28.83 | 6.62 | 2.43 |
| | KG(KCY) | 29.80 | -4.50 | 0.67 |
| | KB(KCM) | 28.71 | 3.11 | -3.49 |
| | KCMY | 27.67 | 1.23 | -0.88 |
| PIXEL b | C | | | |
| | M | | | |
| | Y | | | |
| | R(MY) | | | |
| | G(CY) | | | |
| | B(CY) | | | |
| | CMY | | | |
| | K | | | |
| | KC | | | |
| | KM | | | |
| | KY | | | |
| | KR(KMY) | | | |
| | KG(KCY) | | | |
| | KB(KCM) | | | |
| | KCMY | | | |

COLOR ADJUSTMENT METHOD

FIELD OF THE INVENTION

The present invention relates to a color adjustment method by which it is conducted so that a color tone which is an object, is reproduced, and particularly to a method by which the color adjustment is conducted when a color of a printed part of dot image is composed of a pixel of an object color, and a pixel whose color tone is different color from the object color.

BACKGROUND OF THE INVENTION

Recently, by a spread of DTP (Desk Top Publishing), a process in which an image inputted from a scanner is image-edited and paginated on the software of the computer, is generalized and the editing in the full-digital does not also become rare.

In such a process, in order to promote the more efficiency, an image setter output by which the image data whose page-edition is completed is directly outputted to the film, or CTP (Computer to Plate) output which directly conducts the image recording onto the printing plate, furthermore, CTC (Computer to Cylinder) by which the image recording is directly conducted onto the printing plate wound on a cylinder of printer, are conducted.

Further, in a process of proofing in such a print process, a proof is made and used for mainly 3 uses of (1) confirmation of mistake inside the working site, that is, first proof, (2) an outer proofing submitted for finishing confirmation for an order person, designer, (3) a print sample submitted as a sample of final print to the machine length of printer.

As described above, in the case where a color print is made, when the color proofing is conducted in a step of original film, the proofing print (color proof) is made by suing each color resolution dot original film which is resolved into Y (yellow) plate, M (magenta) plate, C (cyan) plate, and BK (black)plate, and before the print plate is made, it is inspected whether the layout of the original film is correct, whether color is correct, or whether letters are correct, and the finishing of the print is previously confirmed.

In this case, a film output or print output is once conducted only for proofing confirmation, and there is a problem that uselessness of the film, print plate, or additional operation increases, when the print proofing, or the proofing by the other proofing material is conducted.

Accordingly, particularly, in the process in which the full-digital image formation, editing by such a computer, are conducted, a system by which the color image is directly outputted, which is called DDCP (Direct Digital Color Proof) or DCP (Digital Color Proof) is required.

Such a DDCP is a proof by which, before the color image is recorded on the film for printing by an image setter from the digital image data processed on the computer, or a final print operation which directly makes the print plate by CTP, is conducted, or the image recording is directly conducted on the print plate wound on the cylinder of printer by CTC, the color proof by which the output object which is shown by the digital image processed on the computer is reproduced is made, and the confirmation of its image, color tone, sentence letter is conducted.

Further, as a method for making the color proof, there is a color proof making apparatus by which, when, based on the dot image data of each color separation dot original, a light spot formed of a combination of a plurality of light such as, for example, R, G, B, whose wavelengths are different, is exposed in the silver halide photosensitive material and each dot of 3 fundamental colors Y, M, C, is color-generated, the dot image is reproduced, and the color poof is made. Further, in the apparatus, there is DDCP which is a type by which the color adjustment is conducted, when the primary color (ink mono-chrome) which is the color of the printed part of dot image composing the dot image obtained when each color plate of a plurality of ink is printed and superimposed by the printer, the single colors and overprinted colors (the color in which a plurality of ink are superimposed) and the ground color of the print sheet are adjusted to the object colors adjusting the output intensity of 3 fundamental colors so that respective colors are reproduced (for example, Japanese Patent Application O.P.I. No. 2003-149796).

Hereupon, when the color proof is outputted based on the dot image data in the above-described DDCP, although the color tone is adjusted in the solid area, there is some times a case where a phenomena that the color tone is slightly shifted in the intermediate tone area, is generated. For example, in the cyan part, when the dot % of the dot composing the intermediate tone area is reduced, there is a case where it is watched as if yellow lies.

As this countermeasure, it is considered that a method which is called so called Color Management System (CMS) by which the color adjustment is conducted by using the device link profile obtained from respective device profile showing characteristics of the output color of DDCP and the printing press so that the color tone of the outputted image is adjusted, is used. However, in the color adjustment using the Color Management System, for example, in the print, there is a case where a dot of the color which does not originally exist is mixed, and a problem that the plate inspection property is damaged, is generated. Further, because the color management system can not be used for the image data (dot image data) in which screening for making dots is completed, when outputted based on the dot image data, there is also a problem that the color of the dot image can not be adjusted.

Accordingly, the present applicant proposes a method (for example, Japanese Patent Application O.P.I. No. 2005-86229) by which the color of the printed part of dot image composing the dot image outputted based on the dot image data in DDCP, is composed of the pixel of the output color which is adjusted to an object outputted from the printer, and the pixel of the color whose color tone is different from the object color, and outputted. Hereby, the color adjustment can be conducted in the intermediate tone area, further, by this method, the color adjustment can be conducted even for a case where the dot image is outputted based on the dot image data.

SUMMARY OF THE INVENTION

However, although the matching together with the output color which is the object can be conducted when conducted as written in the Patent Document 1, for the color whose color tone is different from the output color which is the object, composing the color of the printed part of dot image of the one hand intermediate tone area, it is difficult to easily found the color. Further, it is tried that the output color is calculated by the calculation using the object color, however, depending on the color of ink used for the printing press, even when the color of the printed part of dot image is composed by using the color found by the calculation, and outputted, there is a case where the color tone is shifted from the color of the object. As the result, there is a case where it becomes difficult to conduct the high accurate color adjustment.

In view of the foregoing, the present invention is attained, and the object of the invention is to provide a color adjustment method by which, when the correction of the difference from the color tone which is the object, generated when the color adjustment is conducted so that the color tone which is the object, is reproduced, is easily and high accurately conducted, the improvement of the accuracy of the color adjustment can be conducted.

In order to attain the above object, the invention written in Item 1 is characterized in that: it includes:

a color adjustment method comprising:

a step for finding the first color difference between the second color space value showing the second color tone and the first color space value showing the first color tone when the first color tone is a target of color adjustment and the second color tone is a output of the target;

a step for finding the moved ratio of a predetermined correction amount added to the first color space value to a moved amount which is derived from the second color space value and the third color space value showing the third color tone when the third color tone is a output of the first color space value with the predetermined correction amount;

and, a step in which the first color space value is corrected with a amount obtained correcting the first color difference with the moved ratio, and the color adjustment is conducted based on the first color space value with the corrected amount, are included.

Further, in the invention of Item 2, the color adjustment method of Item 1, wherein the step for finding the moved ratio includes:

a step for finding the second color difference between the second color space value showing the second color tone and the third color space value showing the third color tone, and the second color difference corresponds to the moved amount for deriving the moved ratio.

Further, the invention of Item 3 is characterized in that: The color adjustment method of Item 2, wherein the predetermined correction amount is the first color difference.

Further, the invention of Item 4 is a color adjustment method by which each area of different color of dot image is formed of pixels of the first color and pixels of the second color whose color tone is different from the first color and the color adjustment is conducted adjusting the first color and the second color, and which is characterized in that:

a step in which an area ratio table showing the area ratios of the first and the second colors for the each area of different color in dot image and the recording medium for each intermediate color of color image is previously prepared;

a step in which the first color space values showing the first color tones of the solid and intermediate colors and the recording medium are obtained as target for color adjustment;

a step in which colors of all areas, the first and second color areas in each different color area of dot image and area of the recording medium, are adjusted with the first color space values of solid and intermediate colors and the recording medium, and the area ratio table;

a step in which the second color space values showing the second color tones of the solid and intermediate colors and the recording medium are obtained from output of the color adjustment;

a step in which the first color differences between the second color space values showing the second color tones and the first color space values showing the first color tones are obtained;

a step in which the third color space values showing the third color tones of the solid and intermediate colors and the recording medium are obtained from output of the first color space values with correction amounts derived from the first color differences;

a step in which the moved ratios of the correction amounts derived from the first color differences to moved amounts derived from the second color differences between the second color space values and the third color space values are derived;

and, a step in which the first color space values are corrected with amounts obtained correcting the first color differences with the moved ratios, and colors of all areas, the first and second color areas in each different color areas of dot image and area of the recording medium, are adjusted with the corrected first color space values of solid and intermediate colors and the recording medium, and the area ratio table, are included.

Further, the invention written in Item 5 is characterized in that: it includes: the color adjustment method of Item 4, wherein the colors of all areas, the first and second color areas in each different color areas of dot image and area of the recording medium, are adjusted, in order to decrease the difference between the sum of all products of each area ratio from the area ratio table and color space value of the area and the corresponding first color space value with or without the correction.

Further, the invention written in Item 6 is characterized in that: the color adjustment method of Item 5, wherein the different color areas of dot image are made superimposing plural dot images of primary colors with different screen angles, and the each different color areas of dot image includes single color areas with one of the primary colors and superimposed colors with more than two of the primary colors.

Further, the invention written in Item 7 is characterized in that: the color adjustment method of Item 6, wherein the colors of all areas, the first and second color areas in the different color areas of dot image and area of the recording medium, are adjusted in the order that the second color areas are adjusted after adjusting the first color areas and the area of the recording medium.

Further, the invention written in Item 8 is characterized in that: the color adjustment method of Item 7, wherein the order of adjusting the second color areas is that the single color areas are adjusted first and the superimposed color areas are adjusted next in the order of the number of superimposed colors starting from two.

Further, the invention written in Item 9 is characterized in that: the color adjustment method of Item 8, wherein the adjustments of the superimposed color areas use the color space values of the second colors previously adjusted.

Further, the invention written in Item 10 is characterized in that: the color adjustment method of Item 4, wherein the color space values are values of the XYZ color space.

Further, the invention written in Item 11 is characterized in that: the color adjustment method of Item 4, wherein the pixels of the first color are arranged in the central part of the area of each different color area of dot image, and the pixels of the second color is arranged in the edge part of the area of each different color area of the dot image.

EFFECT OF THE INVENTION

According to the color adjustment method written in Item 1, when the value of the color space of the object color tone is corrected by the correction amount in which the difference between the color tone when the color adjustment is conducted so that the object color tone is reproduced, and the object color tone is corrected by the ratio of the moved amount by the correction amount, the easy and high accurate color adjustment can be conducted.

According to the color image forming method written in Item 4, in the case where each color of the printed part of dot image is composed of the pixel of the object color and the pixel of the color whose color tone is different from the object color, and the color adjustment is conducted, when the value of the color space of the object color tone is corrected by the correction amount in which the difference of the object color is corrected by the ratio of the moved amount by the correction amount, the easy and high accurate color adjustment can be conducted.

BRIEF DESCRIPTION OF THE DRAWINGS

FIG. 1 is a view showing the corresponding relationship of printed each color with the ink.

FIG. 4 is an explanation view showing an example of the structure of a color channel table of the present embodiment.

FIG. 5 is an explanation view showing an example of the structure of a reference table of the present embodiment.

FIG. 6 is an explanation view showing an example of the structure of an object color table of the present embodiment.

FIG. 7 is an explanation view showing an example of the structure of an area ratio table of the present embodiment.

FIG. 10 is an explanation view showing an example of the structure of an output color table of the present embodiment.

DETAILED DESCRIPTION OF THE INVENTION

Figure 2:
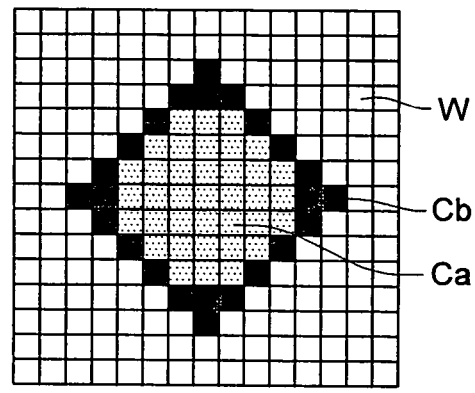
FIG. 2 is a typical view for describing the color of each pixel composing the color of the printed part of dot image.
Figure 2:
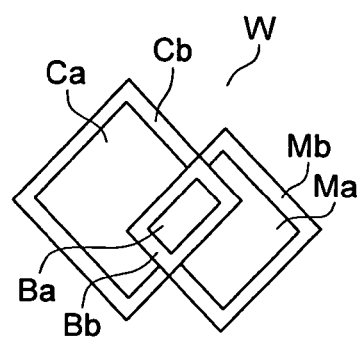
Figure 2:
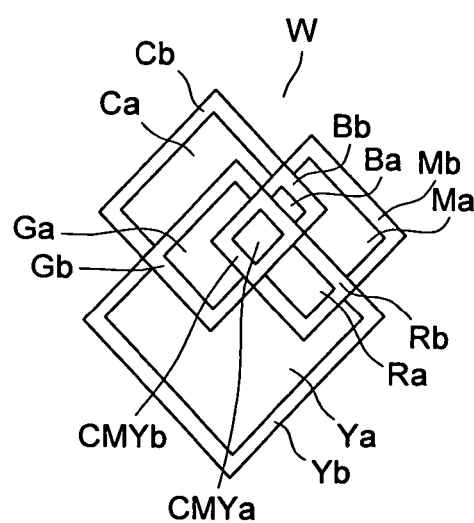

Initially, before the present invention is described, the value of the color space used in the following description will be described. The value of L*a*b* color space is one of the value of the color space expressing the color, and the color is expressed in three dimensional space of L* axis, a* axis, b* axis, and the hue and the chroma are expressed by a* b* plane, and L* is orthogonalized with a* b* plane and the value of color characteristic expressing the lightness. Further, the value of L* a* b* color space is the value based on the value of the XYZ color space found by integrating the light amount by spectro characteristic of $x(\lambda)$, $y(\lambda)$, $z(\lambda)$ determined by CIE (Commission Internationale de l'Eclairage; (in CIE 1931, bar (–) is affixed onto x, y, z)) as the value corresponding to the sensitivity of human eyes. This XYZ is the value called 3 stimulation value of the color, and the color is expressed by 3 dimensional space of x axis, Y axis, Z axis, and X corresponds to the amount of red light, Y corresponds to the amount of green light, Z corresponds to the amount of blue violet light.

Further, from the X value, Y value, Z value of the value of the XYZ color space, L* value, a* value, b* value of the value of L* a* b* color space can be found as follows. Initially, Xd=X/X0, Yd=Y/Y0, Zd=Z/Z0 are set. Where, X0, Y0, Z0 are values in which $x(\lambda)$, $y(\lambda)$, $z(\lambda)$ are respectively added for the all wavelengths (380 nm to 730 nm). Then, $X2=Xd^{(1/3)}$; when Xd>0.008856, Xd×7.787+16/116;

when other than that, $y2=Yd^{(1/3)}$;

when Yd>0.008856, Yd×7.787+16/116;

when other than that, $Z2=Zd^{(1/3)}$;

when Zd>0.008856, Zd×7.787+16/116;

when other than that, X2, Y2, Z2 are found, and L*=Y2×116−16, a*=500×(X2−Y2), b*=200×(Y2−Z2) and the value of the L* a* b* color space shown by L* value, a* value, b* value are found. Further, when inversely operated from the value of the L* a* b* color space, X value, Y value, Z value of the value of the XYZ color space can be found.

In the case where the color adjustment method and a color image forming method of the present invention, are described, as an example, embodiments applied for the color proof making apparatus (color image forming apparatus) will be shown and referring to the drawings, will be specifically described below.

(The Outline of Output)

Initially, the outline of the output of the color proof making apparatus of the present embodiment will be described. The present color proof making apparatus is the gradation image data (called so called vector-graphics and each object is shown by the vector data shown by assembly of the imaging information such as parameters of the equation of the coordinate of the point and the line connecting it or plane, and filling color (shown by the gradation values of YMCK each color. The gradation value is the dot % in which the color is shown stepwise by making white 0, the solid 100, or the value shown stepwise by making white 0, and the solid 255.) or the special effect, the letter font information showing the shape of the letter or its size, or called so called bitmap graphics, and 1 line is composed of a plurality of pixels arranged at a predetermined interval (resolution) in the lateral direction, and further, lines are aligned in the predetermined interval in the longitudinal direction, and the luster data shown by imaging information in which each pixel is shown by the gradation value) is distributed for each color plate, and made the dot image data, and based on the dot image data, color proof is made by the dot image, and the dot image data of each color plate composes the dot by the pixel in the predetermined area, or the dot is arranged so that the alignment direction of the dot in each point is different, in other word, the dot is arranged by changing the so called screen angle in each color, and the dot image data of each color plate is structured so that the thickness is expressed when the dimension of each dot is changed based on its gradation value in the predetermined area.

Further, the dot image is structured by the printed part composed of YMCK dot images, and each color of the printed part of dot image is composed of one color of YMCK or the color in which a plurality of colors are superimposed, (primary color, secondary color, tertiary color, quaternary color, and the description of them will be described later as an example of the printing), and the area of each color is structured by the pixel (hereinafter, there is a case where it is expressed as the pixel a) of the color (first color) adjusted to the output color which is the object, obtained when respective plates of a plurality of ink (C, M, Y, and K) are printed and superimposed, in the printing press which is the object of the color matching (hereinafter, there is a case where it is expressed simply as the printer), and the pixel (hereinafter, there is a case where it is expressed as the pixel b) of the color (second color) whose color tone is different from the output color which is the object. Further, the color of each pixel is outputted by changing the output intensity of fundamental colors (Y, M, C, hereinafter, there is sometimes a case where they are expressed by changing their order, for example, (C, M, Y), (Y, M, C), (C, M, Y). (The detail will be described later). Further, in the present example, the color which is the object, is described as the color of the printed part of dot image composing the dot image obtained when printed and superimposed by using 4-color plates, however, it can be applied to a case where further special color plate is used, or a case where one or two in 4-color plates is used.

Further, the output color which is the object, is the color printed by using each color ink of C, M, Y, K, on the print sheet (recording medium) in the printing press, and the primary color, secondary color, tertiary color, quaternary color (hereinafter, there is sometimes a case where they are summed up, and written as CMYK 1/2/3/4-order color. 2/3/4 order color corresponds to the multi-order colors of the present invention). Primary color is one color in CMYK, the secondary color is the color in which two in CMYK are combined, the tertiary color is the color in which three in CMYK are combined, and the quaternary color is the color in which four in CMYK are combined, and the primary color is C, M, Y, K, the secondary color is R(M+Y) (red), G (C+Y) (green), B(C+M) (blue), K+C, K+M, K+Y, the tertiary color is C+M+Y, KR(K+M+Y), KG (K+C+Y), KB(K+C+M), the quaternary color is C+M+Y+K, and total 15 colors. In FIG. 1, the corresponding relationship of the ink used in respective cases for CMYK 1/2/3/4 and the ground color (W) of the print sheet, is shown by 'x' mark. Further, the order of print and superimposition of the ink is assumed that in FIG. 1, it is printed in the order from the ink of left side, that is, in the order of K→C→M→Y.

Herein, by using FIG. 2, the color and each pixel composing the color of the printed part of dot image will be described. Further, an example of the case where the pixel b is arranged in the edge part, and the pixel a is arranged in the central part and the area of each color of the printed part of dot image is composed (details of the arrangement method will be described later) will be described below.

Initially, by using the typical drawing of FIG. 2(*a*), a case where the printed part of dot image is composed of one dot will be described by making C an example. For example, when one dot is shown by using the area of 15 pixels×15 pixels, as the dot is shown in FIG. 2(*a*), the dot of the dimension corresponding to the dot % is shown in the area of 15 pixels×15 pixels. Herein, when the color corresponding to the pixel a of C is shown as Ca, and the color corresponding to the pixel b is shown as Cb, (it is assumed that, in the same manner also for the other color, a or b is added, the color corresponding to the pixel a, or the color corresponding to the pixel b is shown.) as shown in FIG. 2(*a*), the color of the pixel of the edge part of the area of C is composed of Cb, the color of the pixel of the central part is composed of Ca, and the color of the pixel of the outside of the pixel of Cb, is composed of W.

Next, an example of the print and superimposition of C and M for the case where the printed part of dot image is composed of 2 dots will be described by using FIG. 2(*b*). Because, when the frame of each pixel is displayed, it becomes complicate, it is shown by the neglected typical view. Each dot of C and M is, because C and M are different in the screen angle, as shown in FIG. 2(*b*), the positions of each dot are shifted and superimposed, further, the manner of the shift is different depending on the position of dot, which is not shown. Further, in the color of each pixel composing each color of the printed part of dot image, as shown in FIG. 2(*b*), the pixel of the edge part of the area of B of the superimposed part of C and M, is composed of Bb, the pixel of the central part is composed of Ba, the pixel of the edge part of the area of C except of the superimposed part with M is composed of Cb, the pixel of the edge part of the area of M except of the superimposed part with C is composed of Mb, the pixel of the central part is composed of Ma, and the pixel of further outside is composed of W.

Further next, an example of the print and superimposition of CMY for a case where the printed part of dot image is composed of 3 dots will be described by using the typical view of FIG. 2(*c*). In each dot of C, M and Y, in the same manner as the case of the above secondary color, the position is shifted and superimposed, and in the color of each pixel composing the color of the printed part of dot image, as shown in FIG. 2(*c*), the pixel of the edge part of the area of CMY of the superimposed part of C, M, and Y is composed of CMYb, the pixel of the central part is composed of CMYa, hereinafter, each pixel is, as shown in FIG. 2(*c*), composed of Bb, Ba, Rb, Ra, Gb, Ga, Ca, Cb, Ma, Mb, Ya, Yb, and W.

Further, the arrangement of the pixel b, is not limited to that it is arranged in the edge part, further, the pixel b' whose color tone is further different can also be used in addition to the pixel b.

(The Control Structure of the Color Proof Making Apparatus)

Figure 3:
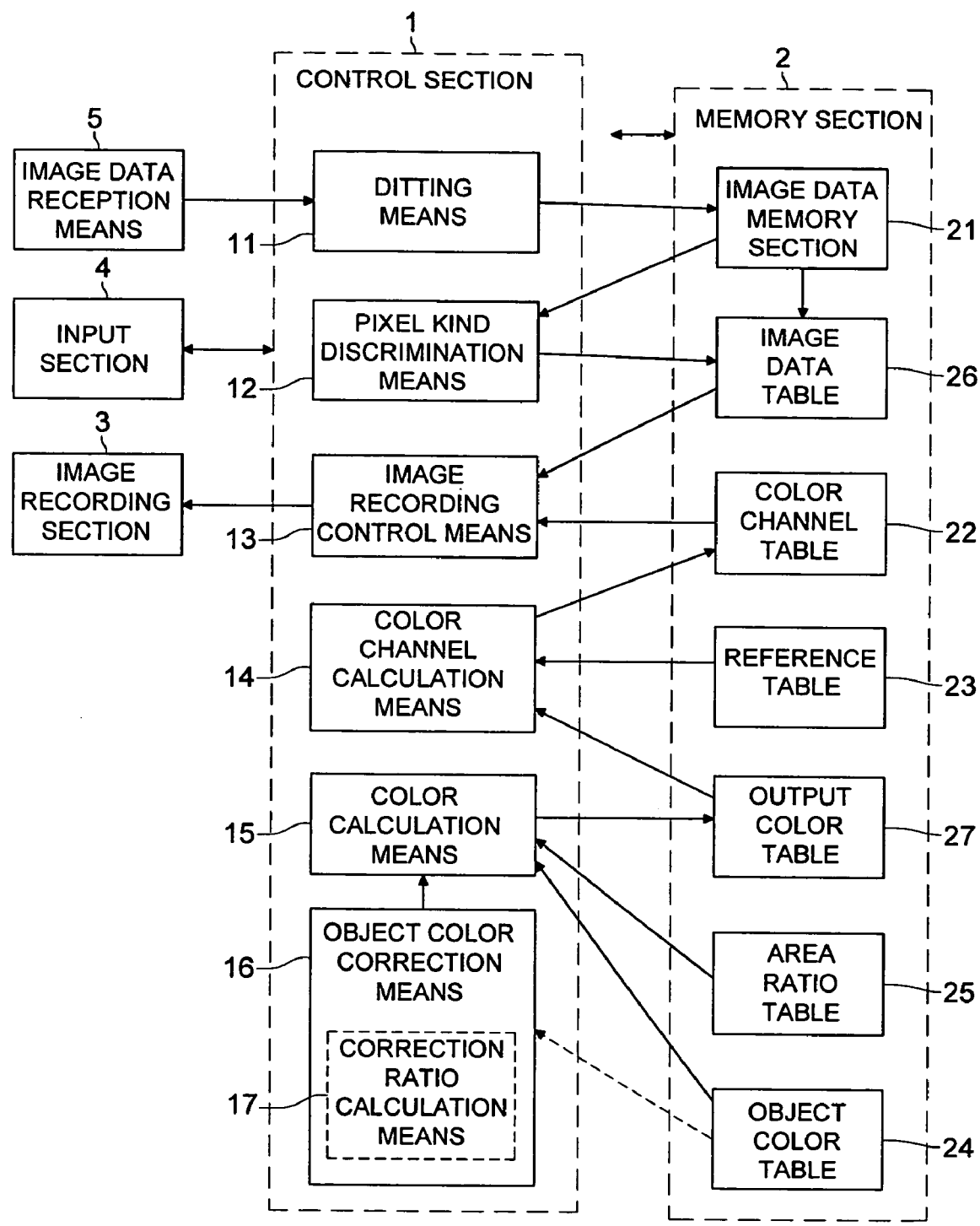
FIG. 3 is a functional block diagram showing the structure of the color proof making apparatus according to the present invention.

Next, as described above, the control structure of the color proof making apparatus by which the gradation image data is print-separated for each color plate of Y, M, C, K and is made the dot image data, and based on the dot image data, the color proof is made, will be described by using FIG. 3. The functional block diagram of the color proof making apparatus is shown in FIG. 3. As shown in FIG. 3, the color proof making apparatus of the present embodiment is structured by the control section 1, memory section 2, image recording section 3, input section 4, and image data reception means 5.

In the image recording section 3, the cyan coloring layer (C layer) of the photosensitive material is exposed by the green (G) light, the magenta coloring layer (M layer) of the photosensitive material is exposed by the red (R) light, the yellow coloring layer (Y layer) of the photosensitive material is exposed by the blue (B) light, developing processing is conducted, C, M, Y which are basic colors, are actualized, and outputted, and the color image is formed. This exposure by the green (G) light, red (R) light, blue (B) light is conducted by simultaneously irradiating the light of these colors for each pixel in the order of the point. Further, when the intensity of the green (G) light, red (R) light, blue (B) light are changed, the output intensity of C, M, Y can be changed, and so that each pixel is outputted in the output intensity of C, M, Y based on the color channel table 22, which will be described later, the table (not shown) in which the output intensity of C, M, Y and the intensity of the green (G) light, red (R) light, blue (B) light are corresponded, is previously accommodated, and each coloring layer is exposed by the intensity of each light corresponding to the output intensity of C, M, Y.

Hereupon, from the point of view of the reproducibility of the gradation by the dot image, it is preferable that the image recording density of the image recorded in the photosensitive material is more than 600 dpi (particularly more than 1000 dpi, further, more than 1200 dpi) both in the primary scanning direction and the sub scanning direction, further, from the point of view of the saturation of the reproducibility of the gradation by the dot image or the image recording speed or the apparatus cost, it is preferable that the image recording density of the image recorded in the photosensitive material is less than 10000 dpi, (particularly, less than 5000 dpi) both in the primary scanning direction and the sub scanning direction. The image recording density in the primary scanning direction and the sub scanning direction is shown by a unit of dpi which shows, in the length of 1 inch in the primary scanning direction or the sub scanning direction, what numbers of the image recorded pixel are aligned.

Further, it is preferable that one dot is recorded from the pixels more than 100 (particularly more than 200) because it becomes the reproduction close to the dot of the actual print. Further, it is preferable that one dot is recorded from the pixel less than 5000 (particularly, less than 2000) because the handling of the image data is easy, and the image data can be processed in the high speed.

Further, it is preferable that the recording pixel number per 1 second of each color of the exposure light is more than $300 \times 10^4$ pixels/sec (particularly, more than $1000 \times 10^4$ pixels/sec). Hereby, the high speed image recording and the highly fine image recording can be compatible. Further, it is preferable that the recording pixel number per 1 second of each color of the exposure light is less than $40 \times 10^8$ pixels/sec (particularly, less than $5 \times 10^8$ pixels/sec). Hereby, the drive circuit is stabilized, the pixel recording is stabilized, the exposure output intensity or the exposure position is stabilized, and the adjustment is easily conducted.

The memory section 2 is structured by the memory apparatus such as the hard disk drive or the image memory, and is provided with the image data memory section 21, the image data table 26, the color channel table 22, the reference table 23, the output color table 27, the object color table 24 and the area ratio table 25.

The image data memory section 21 stores the dot image data which is print-separated for each color plate of C, M, Y, K and made dot. The dot image data forms the dot by the pixel in its area for each area composed of a predetermined number of pixels (for example, 15 pixels×15 pixels), and the dimension of its dot is changed, and the thickness of the image is expressed, for example, when the dot image is composed of n pixels, for each of n pixels for each color plate of Y, M, C, k, a case where it is outputted, is shown by "1", and a case where it is not outputted, is shown by "0".

The image data table 26 is, as shown n FIG. 9, for each of n pixels of the dot image data, a combination of the output "1" of each color plate of YMCK, and not-output "0", and as the discrimination result in the pixel kind discrimination means 12, which will be described later, a case where it is pixel b, is shown by "1", a case where it is not pixel b, is shown by "0".

The color channel table 22 associates the combination of the output intensity of CMYK 1/2/3/4 order color and W and CMY and accommodates it. Further, this color channel table 22 is used for determining the combination of the output intensity of CMY for each pixel when outputted by the image recording section 3. In FIG. 4, an example of the structure of the color channel table 22 is shown. In FIG. 4, an example of the combination of the output intensity of the above CMYK 1/2/3/4 order color and the white ground (in the view, it is displayed as W (white)) is shown while the output intensity of Y is changed from the minimum value 0 to the maximum value 140, and the output intensity of M, C is changed from the minimum value 0 to the maximum value 180 (for the pixel b, a value is omitted).

The reference table 23 shows the output characteristic in the image recording section 3, for example, CMY→L*a*b* LUT which defines the correlation with the value of L*a*b* color space corresponding to the combination of the output intensity of CMY. In FIG. 5, an example of the reference table 23 is shown. FIG. 5 shows the combination of each of 8×10× 10=800 steps expressed by 8 steps in which Y is divided equally by 7, 10 steps in which M, C are divided equally by 9, and the value of L*a*b* color space corresponding to the combination.

Further, the reference table 23 is, although the detail will be described later, a table used for finding the combination of the output intensity of each fundamental color from the value of L*a*b* color space, and in that case, L*a*b*→CMY LUT in which the combination of the output intensity of each fundamental color corresponding to the value of L*a*b* color space, is defined from CMY→L*a*b* LUT, is, for example, as written in the specification of Japanese Patent Application O.P.I. No. 2004-274546 by the present applicant, converging calculation processed, found and used. Accordingly, as the "reference table" of the present invention, L*a*b*→CMY LUT or CMY→L*a*b* LUT may be allowable, that is, when it is a table which shows the correspondence relationship between the output intensity of a plurality of fundamental colors and the value of L*a*b* color space, it may be allowable.

The output color table 27 accommodates, as shown in FIG. 10, the value of L*a*b* color space for the color of respective pixel a of the above CMYK 1/2/3/4 order color, W, and the color of pixel b. Further, in FIG. 10, the value of L*a*b* color space for respective pixel b of the above CMYK 1/2/3/4 order color, is omitted.

In the object color table 24, the value of the color space of the object of color matching is accommodated. Specifically, W, the solid of CMYK 1/2/3/4 order color printed by using each color ink of C, M, Y, K on the print sheet in the printing press, and the value of L*a*b* color space of the intermediate color of each color of CMYK 1/2/3/4 order color are previously accommodated. Herein, the solid is a color in which the dot area rate (there is sometimes a case where it is called the dot %) of each dot of the color composing each color of CMYK 1/2/3/4 order color is 100%, and the intermediate color of each color of CMYK 1/2/3/4 order color is a color in which the dot % of each dot of the color composing each color of CMYK 1/2/3/4 order color is not larger than 100% except 0% and equal. In FIG. 6, an example of the structure of the object color table 24 is shown, however, for each color of CMYK 1/2/3/4 order color, the values of L*a*b* color space of the intermediate color of 10%, 20%, . . . , 90%, and the value of L*a*b* color space of the ground color of the print sheet is shown in 0% of each color, and the value of L*a*b* color space of the solid is shown in 100% of each color (for 2/3/4 order color in which K is included, the specific value is omitted).

The area ratio table 25 is a table in which for each color of CMYK 1/2/3/4 order color, the area ratio of the color composing each color in the intermediate color is accommodated (relating to the calculation method of the area ratio, it will be described later). In FIG. 7, for each color of CMYK 1/2/3/4 order color, the area ratio for the color composing the intermediate color is shown by notching the dot of the color plate composing each color in the notch of 10% (10%, 20%, . . . 80%, 90%). The primary color is, as shown in FIG. 2, for example, when it is C, composed of W, Ca and Cb, and the multi-order color is, when B (secondary color) is an example, in the intermediate color, as shown also in FIG. 2(b), because the dots of C and M are sifted and superimposed, it is composed of W, Ca, Cb, Ma, Mb, Ba and Bb. Then, the area ratio of each of these colors is shown by the ratio of its color to the entire area, and for example, Ba in the intermediate color of B is (the area of Ba/entire area) is accommodated (Specific value is omitted. Further, the calculation method of specific area ratio will be described later).

The control section 1 is structured by calculation control device such as CPU, and controls of each part of the apparatus when the computer program accommodated in the program accommodating section (illustration is omitted) such as ROM (Read Only Memory) or the hard disc drive is conducted. Further, the work area when each kind of calculation conducted in the present embodiment is conducted, is structured, and the control section 1 is structured by including the memory (not shown) in which each kind of data is temporarily stored. The control section 1 operates, according to the computer program, as the screening means 11, the pixel kind discriminating means 12, the image recording control means 13, the color channel calculation means 14, the color calculation means 15 and the object color correction means 16.

The screening means 11 is accepted by The image data interface means 5. For example, the gradation image data is made dot by AM screening (Amplitude Modulation Screening) by using the dot reference data, and for each area composed of a predetermined number of pixels (for example, 15 pixels×15 pixels), the dot is formed by the pixel in its area, and the size of its dot is changed, and converted to the dot image data of each color plate expressing the thickness of the image. Further, when the accepted image data is the dot image data, the dot image data and the converted dot image data are stored in the image data memory section 21.

The pixel kind discrimination means 12 conducts the discrimination of the pixel a or W (white) and the pixel b, for each pixel composing the dot image data for the purpose that each color of the printed part of dot image is composed of the pixel a and the pixel b.

Herein, an example in which, as shown in FIG. 2(a) to (c), the discrimination is conducted so that the edge part is composed of the pixel b, and the central part is composed of the pixel a, will be described. In this case, 3×3 digital filter shown in FIG. 8 is used. For each dot image data of each color plate, it is scanned by using the digital filter, and for the pixel positioned in the center 121 of the digital filter, the discrimination is conducted as follows. For the dot image data of each color plate, when the data of the pixel 121 positioned in the center is not outputted "0", it is discriminated that it is not pixel b, and in the case where the data of the pixel 121 positioned in the center is outputted "1", when more than 2 of 8 pixels 122 of its edge part are not outputted "0", it is discriminated that the pixel 121 positioned in the center is the pixel b, and when it is not more than 2, it is discriminated that it is the pixel a, that is, not the pixel b. Then, for at least any one color plate, when it is discriminated that it is the pixel b, the pixel is the pixel b, and when it is not discriminated also for any color plate, that it is the pixel b, it is discriminated that the pixel is not the pixel b. By such a discrimination, the pixel of the edge part of each color of the printed part of dot image as shown in FIG. 2(a) to (c), is made the pixel b, and the central part can be made the pixel a.

Further, when the above 3×3 digital filter is used, the pixel b is structured almost in one row in the edge part, however, by using, for example, 5×5 digital filter, it is also possible that the pixel b is structured in two rows in the edge part, and also when the condition of the pixel of the periphery used for the discrimination is changed, it is also possible that the structure of the pixel b is changed.

Further, according to the this method using the digital filter, there is sometimes a case where the edge part of the solid image also becomes the pixel b, however, because it is for several pixels of the edge part, and the gradation is not almost influenced, there is no problem even when the pixel b is included in the edge part of the solid area.

The image recording control means 13 is the control means of the present invention, and from the dot image data color-separated for each color plate of C, M, Y, K and the discrimination result by the pixel kind discrimination means 12, referring to the color channel table 22 for each pixel of n, finds the combination of the output intensity of CMY, and controls the image recording section 3 so that it is outputted in the combination of the output intensity. In the image recording section 3, it is received, and each pixel is exposed by the intensity of green (G) light, red (R) light, blue (B) light corresponding to the combination of its output intensity of CMY.

The combination of the output intensity of CMY is, specifically, from the dot image data, it is discriminated that the color to be outputted is any one of W or CMYK 1/2/3/4 order color, further, from the discrimination result in which it is the pixel b or not, the combination of the output intensity of the CMY is found as follows from the color channel table 22.

Figures 8, 9:
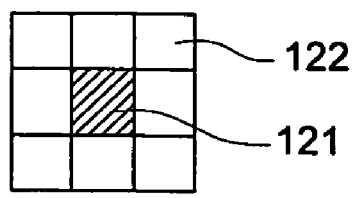
FIG. 8 is an explanation view for explaining an example of a digital filter used for an image kind discrimination.
FIG. 9 is an explanation view showing an example of an image data table showing whether there is an output of YMCK and it is the pixel b, for each pixel composing a dot image data.
Figure 11:
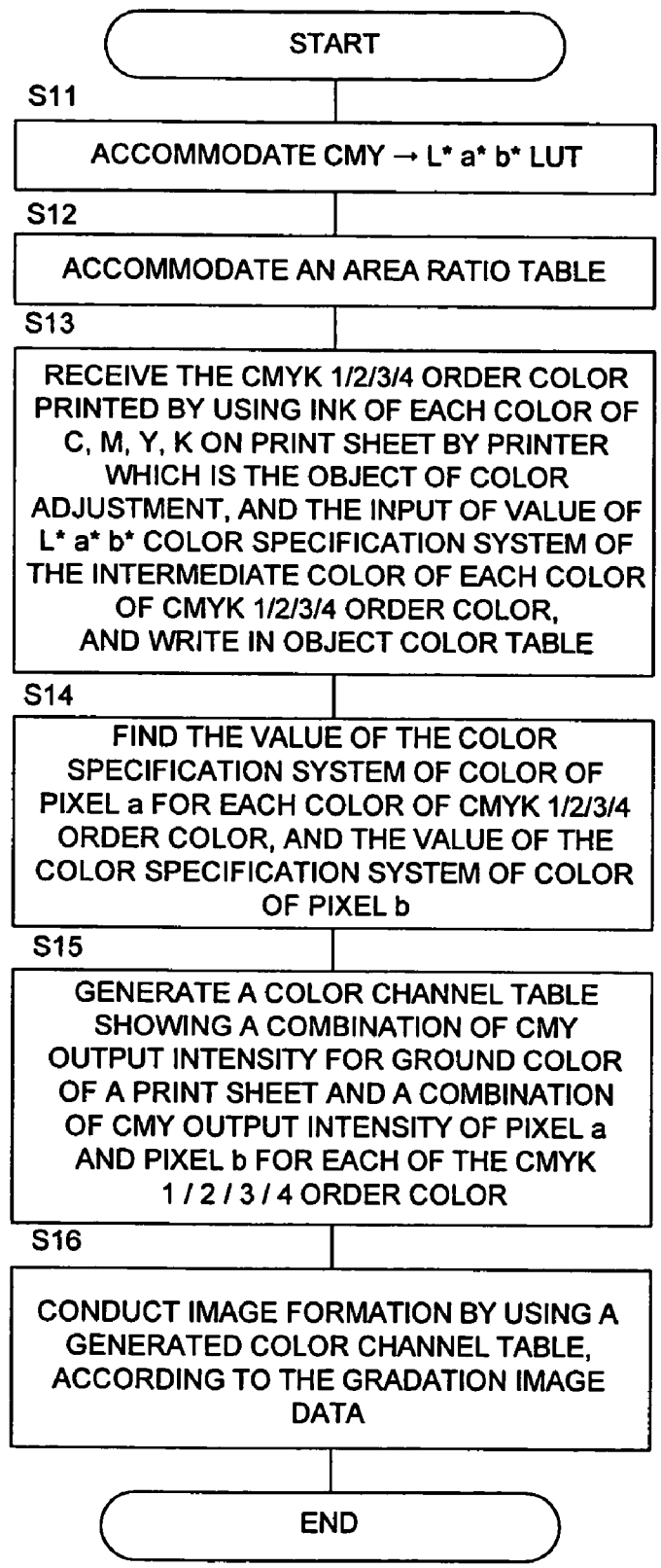
FIG. 11 is a flowchart showing an example of the sequence by which a color adjustment is conducted so that the color is matched with an output color of a printer which is an object of the color adjustment, and a color image is formed.

The image data table 26 in FIG. 9 is a table in which, for each pixel of n of the pixel n from the pixel 1, the combination in which each color plate of YMCK is outputted "1", not outputted "0", and the discrimination result of the pixel kind discrimination means 12 is shown as "1" when it is the pixel b, "0" when it is not the pixel b, however, because the pixel 1 is not W and the pixel b because KCMY is "0", the combination of the output intensity of CMY is made a value corresponding to W (white) of the pixel a of the color channel table 22 shown in FIG. 4, the pixel 2 is, because KCMY is "0", because it is not W and the pixel b, the combination of the output intensity of CMY is made a value corresponding to W (white) of the pixel a of the color channel table 22 shown in FIG. 4, and the pixel 3 is, because K is "1", CMY is "0" and it is the pixel b, the combination of the output intensity of CMY is made a value corresponding to K of the pixel b of the color channel table 22 shown in FIG. 4, the pixel K is, because CM is "1", KY is "0", and it is the pixel b, the combination of the output intensity of CMY is made a value corresponding to B (CM) of the pixel b of the color channel table 22 shown in FIG. 4, the pixel k+1 is, because M is "1", KCY is "0", and it is not the pixel b, the combination of the output intensity of CMY is made a value corresponding to M of the pixel a of the color channel table 22 shown in FIG. 4, and the pixel n is, because it is not W and the pixel b because KCMY is "0", the combination of the output intensity of CMY is made a value corresponding to W (white) of the pixel a of the color channel table 22 shown in FIG. 4.

The color calculation means 15 has a function as the first calculation means by which the value of L*a*b* color space of the color of the pixel a for each of CMYK 1/2/3/4 order color is accommodated in the output color table 27 as the value of the color space of the solid of CMYK 1/2/3/4 order color, which is the object, and a function as the second color calculation means by which the value of L*a*b* color space of the color of the pixel b is calculated based on the area ratio table 24 and found (details will be described later), by using the value of the color space of the solid of CMYK 1/2/3/4 order color, which is the object, the value of L*a*b* color space of the of intermediate color of each color of CMYK 1/2/3/4 order color, and the value of L*a*b* color space of W, and is accommodated in the output color table 27. Herein, "what is the object" shows the object color at the time of calculation, and the object color is, in the present embodiment, as shown in the sequence of the processing which will be described later, the value of L*a*b* color space accommodated in, for example, the object color table 24, or the value of L*a*b* color space corrected by the object color correction means 10.

The color channel calculation means 14 founds the combination of CMY output intensity corresponding to the value of L*a*b* color space of the color of the pixel a and the pixel b for CMYK 1/2/3/4 order color accommodated in the output color table 27 based on CMY→L*a*b* LUT which is a reference table 23, and generates the color channel showing the combination of CMY output intensity for each color. Accordingly, it has a function as the generation means of the present invention.

For example, as written in the specification of Japanese Patent Application O.P.I. No. 2004-274546 by the present applicant, from CMY→L*a*b* LUT, L*a*b*→CMY LUT is found. Then, for the value of L*a*b* color space by which the combination of CMY output intensity is found, from the input point of L*a*b*→CMY LUT, from the distance between the output intensity of C, M, Y for 8 points in which L*2 points (L1, L2), a*2 points (a1, a2), b*2 points (b1, b2) are combined, and each input point of L*a*b* each value of the value of L*a*b* color space, the combination of the output intensity of C, M, Y to the value of accommodated L*a*b* color space can be found.

The object color correction means 16 has a function as the first correction means by which the difference between the value of L*a*b* color space obtained by measuring the solid of CMYK 1/2/3/4 order color outputted from the image recording section 3, the image of the intermediate color and the value of L*a*b* color space of each color accommodated in the object color table 24, is made the correction amount, and the value of L*a*b* color space of each color of the object color table is corrected, and a function as the second correction means which has the correction ratio calculation means 17 for finding the ratio of the moving amount of each color outputted to the correction amount, as the correction ratio, and by which the value of L*a*b* color space of respective colors of the object color table is further corrected by the correction amount by which the correction amount of the previous correction is corrected by the correction ratio.

The input section 4 is a section for inputting each numeral value accommodated in the reference table 23, the object color table 24, and the area ratio table. Further, for example it may be an interface for connecting a measuring device, or may also be a device such as the reading device installed in the manner that FD (Floppy (trade name) Disk) in which the area ratio, colorimetric result are inputted, can be taken in and out.

The image data interface means 5 is structured by the sending and receiving interface circuit, and the gradation image data or the dot image data sent from the external terminal, not shown, is received. Further, it may also be a device such as the reading device installed in the manner that CD-ROM (Compact Disk-Read Only Memory) in which each image data is inputted, can be taken in and out.

(Color Adjustment Method)

Next, a sequence of each processing in the color proof making apparatus of the present embodiment to which the color adjustment method of the present invention is applied, will be described by using a flowchart shown in FIG. 11 to FIG. 14. Hereinafter, for example, when it is step S11 in FIG. 10, it is omitted, and each step is displayed by S11. The other steps are the same. Initially, in the flowchart shown in FIG. 11, an example of the sequence by which the color adjustment is conducted so that the color is adjusted to the output color of the object printer of the color adjustment, and the color image is formed, is shown.

Initially, as the reference table 23, CMY→L*a*b* LUT, shown in FIG. 5 is previously accommodated (S11). The reference table 23 shown in FIG. 5 is structured by each combination and the value of L*a*b* color space corresponding to the combination, obtained when Y is equally divided by 7 and is made 8 steps, M, C is equally divided by 9 and made 10 steps, and each patch of 8×10×10=800 ways structured by the combination of each step is outputted by the image recording section 3 and measured.

Further, the area ratio table 25 as shown in FIG. 7, is previously accommodated (S12). The area ratio table is a table in which, for each color of CMYK 1/2/3/4 order color, the area ratio of the color composing each color in the intermediate color of 10% notch (10%, 20%, . . . 90%) is accommodated. Further, the area ratios composing the area ratio table 25 can be found as follows. For example, the dot of the color composing each color of CMYK 1/2/3/4 order color, is, to the gradation image data (for example, when B is taken as an example, 10% patch is the image data composed of the pixel of C10% M 10% Y 0% K 0%, 20% patch is the image data composed of the pixel of C 20% M 20% Y 0% K 0%, . . . , 90% patch is the image data composed of the pixel of C 90% M 90% Y 0% K 0%) composing a plurality of patches of 10% notch (10%, 20%, . . . 90%), the same making-dot as the making-dot conducted by the making-dot means 11 of the present color proof making apparatus, is conducted, and further, the same discrimination as the discrimination conducted by the pixel kind discrimination means 12 is conducted, and from the result, it is found as follows. For the primary color, from the pixel number of W of the area composing one dot, the number of pixel a and the number of pixel b, the ratio to the pixel number of the area composing one dot of each pixel number can be easily found as the area ratio. However, in the multi-order color more than the secondary color, because the screen angle of each color plate is different, and each dot is shifted and superimposed, in the area in the degree in which one dot is composed, because the area ratio becomes different depending on the selected position, the dislocation of the dot is considered, and it is preferable that the patch whose size is more than the area of whose size so that the error is small, is used, and for each patch, for example, the image data table as shown in FIG. 9 is made, and for the color composing the patch, when the pixel number of each color in the patch is counted, and the ratio to the pixel number composing the patch is found, it can be determined. For example, when it is B patch, because the color composing B patch is, as shown in FIG. 7, 7 colors of Ca, Cb, Ma, Mb, Ba, Bb, W, the ratio to the pixel number composing the patch of the pixel number of 7 colors, is found as the area ratio. Hereinafter, it is defined that the area ratio of each color is shown in the manner that f is attached before each color. For example, when B is an example, each area ratio is displayed in the manner of fCa, fCb, fMa, fMb, fBa, fBb, fW.

These tables may also be received by the control section 1 through the input section 4, and made, or the control section 1 writes them in the computer program accommodated in its program accommodation section, and the control section 1 may also make based on the computer program.

Next, the input of the value of L*a*b* color space (the value of the first color space) of the solid of CMYK 1/2/3/4 order color which is the first color tone of the present invention, printed on the print sheet by the printer which is the object of the color adjustment from the input section 4 by using the ink of each color of C, M, Y, K, the value of L*a*b* color space (the value of the first color space) of the color of the print sheet, and the value of L*a*b* color space (the value of the first color space) of the intermediate color of each color of C, M, Y, K 1/2/3/4 order color, are received, and the control section 1 writes (S13) them in the object color table 24 (refer to FIG. 6) of the memory section 2. For example, the value of inputted L*a*b* color space is a value in which the color chart including each patch of the intermediate color in which the dot of color plate composing each color of C, M, Y, K 1/2/3/4 order color, is notched in 5% notch (0%, 5%, 10%, 15%, 20%, . . . 90%, 95%, 100%), the color of the print sheet, and the solid, is printed on the print sheet by the printer, and color-measured.

Figure 14:
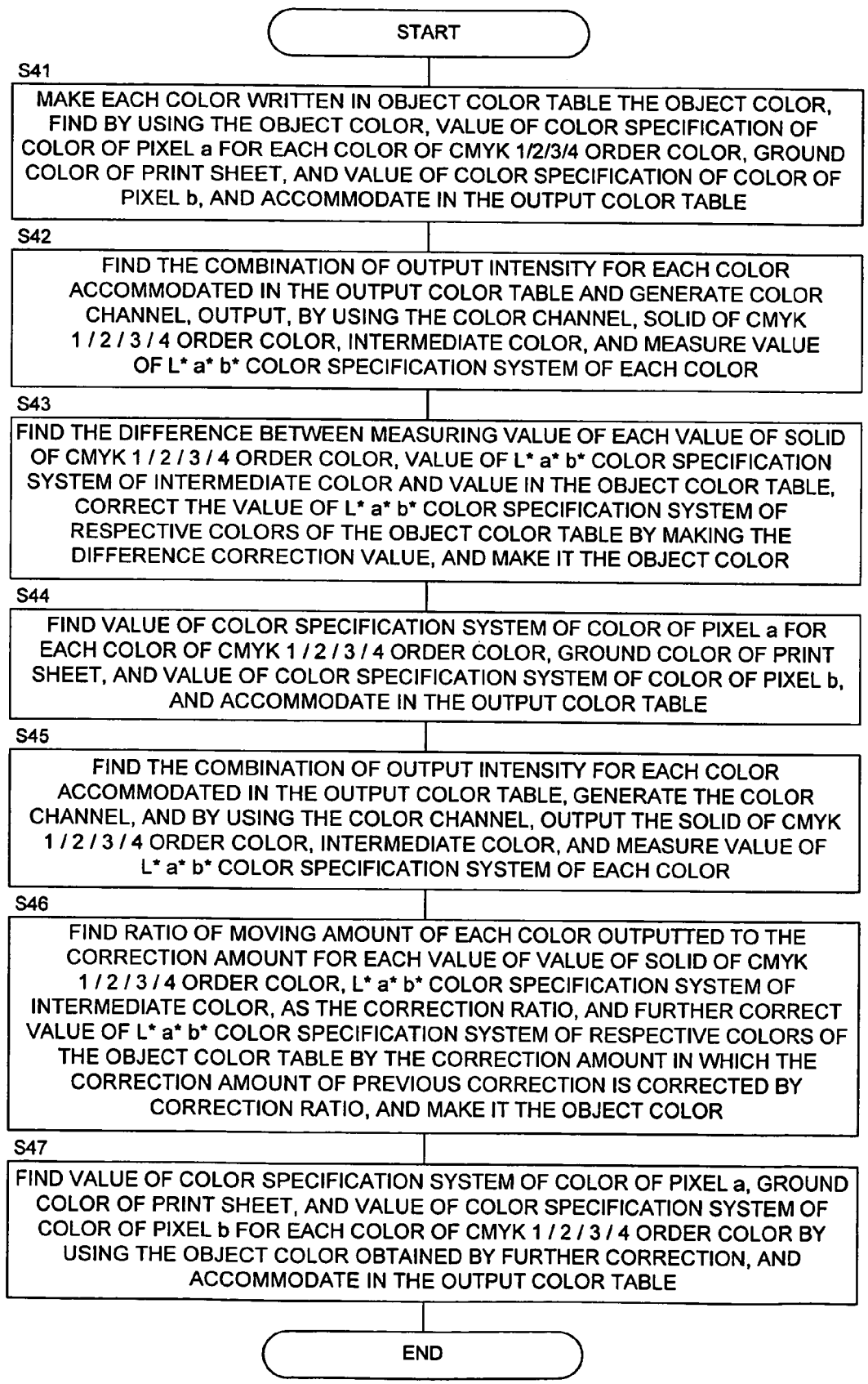
FIG. 14 is a flowchart showing the sequence for finding a value of L*a*b* color space of the pixel a and the pixel b.

Then, the value of L*a*b* color space of the color of the pixel a for each color of CMYK 1/2/3/4 order color, the value of L*a*b* color space of the ground color (W) of the print sheet, and the value of L*a*b* color space of the pixel b are found (S14). Herein, the description will be conducted by using the flowchart shown in FIG. 14. FIG. 14 is a flowchart showing the sequence for finding the value of L*a*b* color space of the pixel a and the pixel b.

Figure 12:
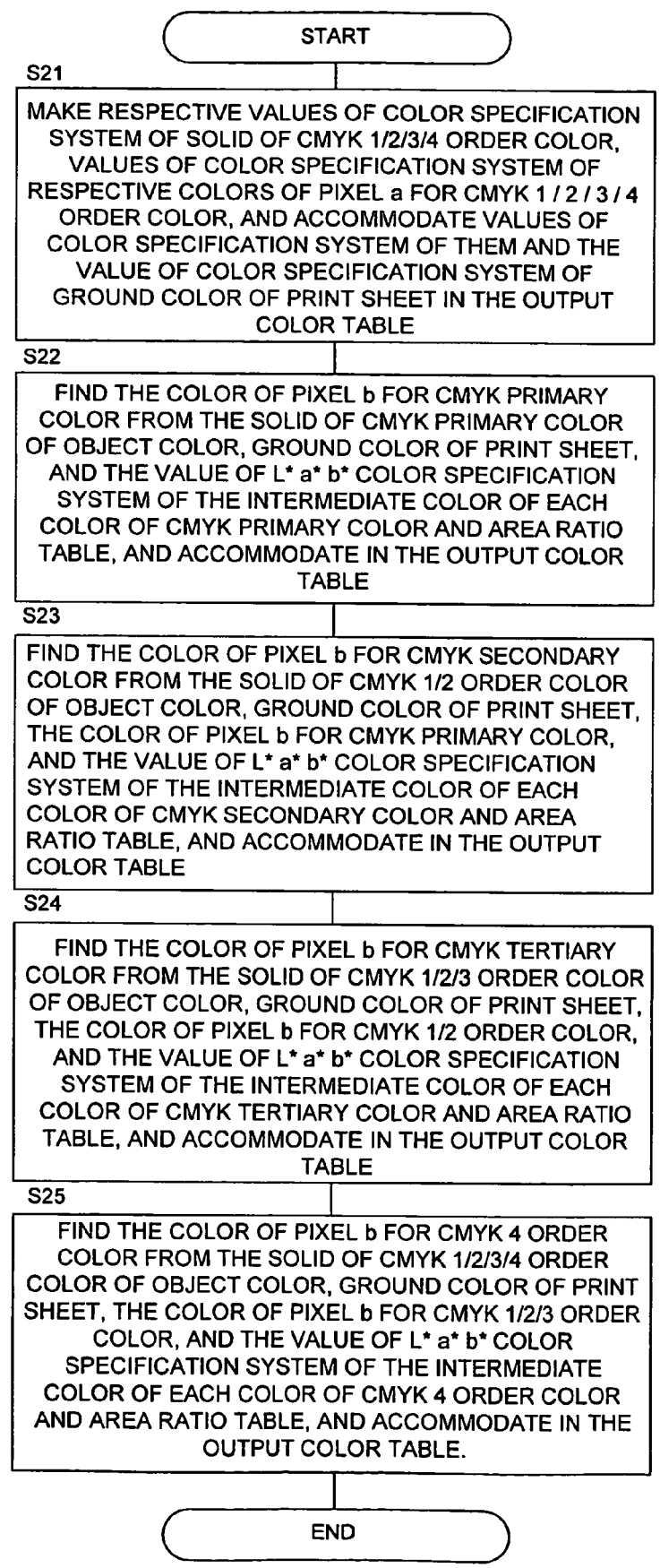
FIG. 12 is a flowchart showing the sequence for finding a value of L*a*b* color space of the pixel a and the pixel b.

Firstly, each color written in the object color table 24 is made as the object color, and by using the object color, the color calculation means 15 finds the value of the color space of the color of the pixel a, the ground color of the print sheet, and the value of the color space of the color of the pixel b, and accommodates in the output color table (S41). The detail of the finding method of the value of the color space will be described by using the flowchart shown in FIG. 12. FIG. 12 is a flowchart showing the sequence for finding the value of L*a*b* color space of the pixel a and the pixel b conducted by the color calculation means 15.

The color calculation means 15 makes the respective values of the color space of the solid of CMYK 1/2/3/4 order color of the object color, the value of the color space of respective colors of pixel a for each color of CMYK 1/2/3/4 order color, and accommodates the value of the color space of those colors of the pixel a and the value of L*a*b* color space of W in the output color table 27 (S21).

Then, initially, the color of the pixel b for each color of CMYK primary color is found by using the value of L*a*b* color space of the intermediate color of each color of CMYK primary color of the object color, the value of L*a*b* color space of W accommodated in the output color table 27 and the value of L*a*b* color space of the color of the pixel a of the CMYK primary color, and the area ratio of the color composing each color of CMYK primary color in the intermediate color of the area ratio table 25, and accommodated in the output color table 27 (S22). In the following calculation, as the value of the color space, the value of XYZ color space is used. That is because the value of XYZ color space is the value linear to the light amount, and the color composed of a plurality of colors can be shown by the sum of the product of the value of XYZ color space of the composing color with the area ratio. Further, the value of XYZ color space can be found from the value of L*a*b* color space as described in the beginning of "the Detailed Description of the Invention", and from the value of XYZ color space, the value of L*a*b* color space can be found.

For example, C shown in FIG. 2(a) is made an example and it will be described. Herein, X value of the object color of the intermediate color of C is made XC, Y value is made YC, Z value is made ZC. Further, because the intermediate color of C is as shown in FIG. 2(a), composed of the pixel of W, the pixel of Ca, the pixel of Cb, when the X value of W is made XW, T value is made YW, Z value is made ZW, X value of the color of color Ca of the pixel a of C is made Xca, Y value is made Yca, Z value is made Zca, X value of the color Cb of the pixel b is made XCb, Y value is made Ycb, Z value is made ZCb, and the area ratio of W in the intermediate color is made fW, the area ratio of the pixel a of C is made fCa, the area ratio of the pixel b of C is made fCb, because XC of X value of the intermediate color of C, YC of Y value, ZC of Z value can be shown by the total value in which the product of the value of the XYZ color space of the composing color and the area ratio are respectively added, XC=fW×XW+fCa×Xca+fCb×XCb, YC=fW×YW+fCa×Yca+fCb×Ycb, ZC=fW×ZW+fCa×Zca+fCb×ZCb can be expressed.

For the XYZ value except Cb in the above expressions, XC, YC, ZC of the object color of the intermediate color of C are found from the value of L*a*b* color space of the object color of the intermediate color of C, XCa of Ca, YCa, ZCa are found from the value of L*a*b* color space of the color of the pixel a of C accommodated in the output color table 27, and each area ratio is accommodated in the area ratio table 25. Accordingly, XCb of X value of the color of the pixel b, YCb of Y value, ZCb of Z value can be found so that the total sum of the value of the color space of the right side of the above expressions is the value of the color space of the left side.

For example, by using the above expression, XCb of X value of the color of the pixel b in the intermediate color, ZCb of Z value are found, and by using the average value of the result, XCb of X value of the color of the pixel b for C, YCb of Y value, and ZCb of Z value may also be determined. Further, because obtained value of XYZ color space is used for finding the combination of CMY output intensity based on the reference table 23, it is converted into the value of L*a*b* color space. In the same manner, the value of L*a*b* color space of the color of the pixel b is found also for M, Y, K.

Next, the color of the pixel b for each color of CMYK secondary color is found by using the value of L*a*b* color space of the intermediate color of each color of the CMYK secondary color of the object color, the value of L*a*b* color space of W accommodated in the output color table 27, the value of L*a*b* color space of the color of the pixel a of CMYK 1/2 order color, and the value (the value of XYZ color space may also be used as it is) of L*a*b* color space of the pixel b of CMYK primary color found in S22, and the area ratio of the color composing each color of CMYK secondary color in the intermediate color of the area ratio table 25 (S23).

For example, B shown in FIG. 2(b) is taken as an example, and will be described. Herein, X value of the object color of the intermediate color of B is made XB, Y value is YB, Z value is ZB. Further, because the intermediate color of B is, as shown in FIG. 2(b), composed of the pixel of W, the pixel of Ca, the pixel of Cb, the pixel of Ma, the pixel of Mb, the pixel of Ba, and the pixel of Bb, when X value of W is made XW, Y value is made YW, Z value is made ZW, X value of the color Ca of the pixel a of C is XCa, Y value is YCa, z value is ZCa, X value of color Cb of the pixel b is made XCb, X value of color Ma of the pixel a of M is made XMa, Y value is YMa, Z value is ZMa, X value of color Mb of the pixel b is XMb, Y value is YMb, Z value is ZMb, X value of color Ba of the pixel a of B is made XBa, Y value is YBa, Z value is ZBa, X value of color Bb of the pixel b is XBb, Y value is YBb, Z value is ZBb, and the area ratio of W in the intermediate color is made fW, the area ratio of the pixel a of C is fCa, the area ratio of the pixel b of C is fCb, the area ratio of the pixel a of M is fMa, the area ratio of the pixel b of M is fMb, the area ratio of the pixel a of B is fBa, and the area ratio of the pixel b of B is fBb, XB of X value of the intermediate color of B, YB of Y value, ZB of Z value can be expressed by XB=fW×XW+fCa×XCa+ fCb×XCb+fMa×XMa+fMb×XMb+fBa×XBa+fBb×XBb, YB=fW×YW+fCa×YCa+fCb×YCb+fMa×YMa+fMb× YMb+fBa×YBa+fBb×YBb, ZB=fW×ZW+fCa×ZCa+fCb× ZCb+fMa×ZMa+fMb×ZMb+fBa×ZBa+fBb×ZBb.

XYZ value except Bb of the above expression is found from the value of L*a*b* color space of the object color of the intermediate color in the same as the case of the primary color, and the value of L*a*b* color space accommodated in the output color table 27, and each area ratio is accommodated in the area ratio table 25. Accordingly, from the above expression, X value of the color of the pixel b is found as XBb in the same manner as the case of the primary color, Y value is found as YBb, Z value is found as ZBb, and the value of L*a*b* color space can be found. In the same manner, also for R, G, KC, KM, KY, the value of L*a*b* color space of the color of the pixel b is found.

Furthermore, the color of the pixel b for each color of CMYK tertiary color is found by using the value of L*a*b* color space of the intermediate color of each color of CMYK tertiary color of the object color, the value of L*a*b* color space of W accommodated in the object color table 24, the value of L*a*b* color space of the color of the pixel a of CMYK 1/2/3 order color, and the value of L*a*b* color space of the pixel b of CMYK 1/2 order color found in S21 and S22 (the value of XYZ color space is also allowable), and the area ratio of the color composing each color of CMYK tertiary color in the intermediate color of the area ratio table 25 (S24). Although detailed calculation expression is omitted, in the same manner as S22, S23, from the value of L*a*b* color space of the object color of the intermediate color of the tertiary color, the value of L*a*b* color space of W, the value of color space of each color of the pixel a and the pixel b composing the tertiary color, and the area ratios of those colors, the value of L*a*b* color space of the color of the pixel b of the tertiary color is found.

Next, the color of the pixel b for CMYK 4-order color is found by using the value of L*a*b* color space of the intermediate color of CMYK 4-order color of the object color, the value of L*a*b* color space of W accommodated in the output color table 27, the value of L*a*b* color space of the pixel a of CMYK 1/2/3/4 order color, and the value of L*a*b* color space of the pixel b of CMYK 1/2/3 order color found in S22, S23 and S24 (the value of XYZ color space is also allowable), and the area ratio of the color composing the intermediate color of CMYK 4-order color of the area ratio table 25 (S25). Although detailed calculation expression is omitted, the value of L*a*b* color space of the color of the pixel b of 4-order color is found from, in the same manner as S22, S23, and S24, the value of L*a*b* color space of the intermediate color of 4-order color, the value of L*a*b* color space of W, the value of the color space with each color of the pixel a and the pixel b composing 4-order color, and the area ratios of those colors.

Returning again to FIG. 14, the color channel calculation means 14 finds the combination of the output intensity for each color accommodated in the output color table 27 and generates the color channel table 22, and the image recording control means 13 controls the image recording section 3, and by using the color channel table 22, outputs the solid of CMYK 1/2/3/4 order color, and the intermediate color. Then, measures the value of L*a*b* color space of each color including W as the second color tone of the present invention (the value of the second color space) (S42).

Herein, the generation of the color channel table 22 will be described. The color channel calculation means 14 finds, the combination of CMY output intensity based on the reference table 23, from the value of L*a*b* color space of W accommodated in the output color table 27, the value of L*a*b* color space of the color of the pixel a of CMYK 1/2/3/4 order color, and the value of L*a*b* color space of the color of the pixel b of CMYK 1/2/3/4 order color, and generates the color channel table 22. As described above, for example, as written in the specification of Japanese Patent Application O.P.I. No. 2004-274546 by the present applicant, finds L*a*b*→CMY LUT, from CMY→L*a*b* LUT. Then, for the value of L*a*b* color space by which the combination of CMY output intensity is found, from the output intensity of C, M, Y for 8 points in which L*2 points (L1, L2) in the vicinity of the value of L*a*b* color space from the input point of L*a*b*→CMY LUT, a* 2 points (a1, a2), b* 2 points (b1, b2) are combined, and the distance to each input point of L*a* b* each value of the value of L*a*b* color space, the combination of the output intensity of C, M, Y to the accommodated value of L*a*b* color space can be found.

Further, the measurement of the value of L*a*b* color space is conducted by using the calorimeter, and may also be inputted through the input section 4. Further, in the image recording section 3, the calorimeter and the moving means for moving the calorimeter so that the output of the solid of CMYK 1/2/3/4 order color, the intermediate color can be color-measured are housed, and when the control section 1 controls, by the calorimeter and the moving means, so that the output object of the solid of CMYK 1/2/3/4 order color, the intermediate color is color-measured, the measurement result of the value of L*a*b* color space can also be obtained.

Then, the object color correction means 16 finds the difference (the first difference) between W, the solid of CMYK 1/2/3/4 order color accommodated in the object color table 24 and the value of L*a*b* color space of the intermediate color and the value of L*a*b* color space of each color obtained by the measurement, for each value of L*a*b*, and the value of L*a*b* color space of each color accommodated in the object color table 24 is corrected, and the value of L*a*b* color space obtained by the correction is made the object color (S43).

Figure 15:
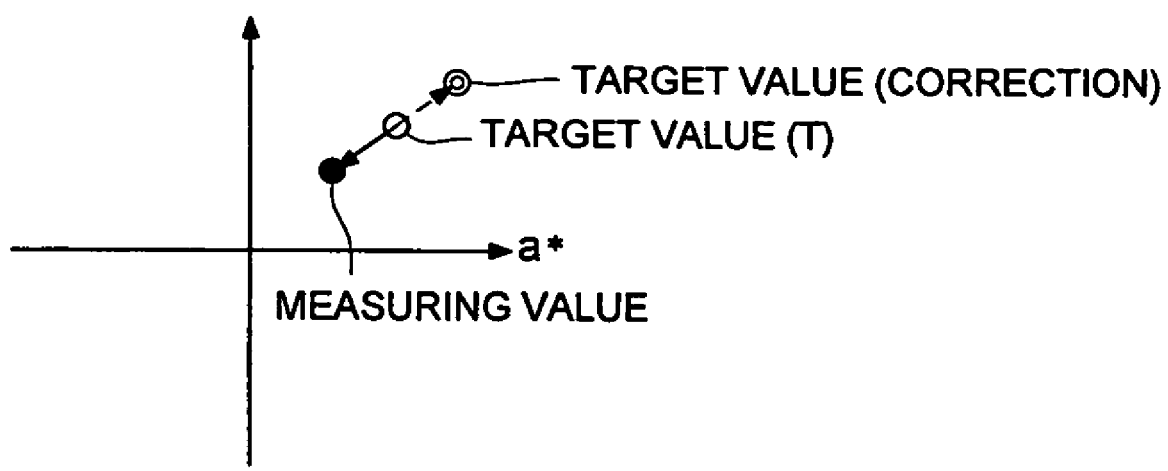
FIG. 15 is an explanation view for explaining an example of the correction of an object color.

By using FIG. 15, the correction will be described. FIG. 15, the value of L*a*b* color space of the color obtained by the measurement is made the measurement value, the value of L*a*b* color space of the color accommodated in the object color table 24 is made the object color (T), the value of L*a*b* color space after correction is made the object color (correction 1), and shows them on a*b* coordinate. Further, the direction and the largeness of the difference are shown by the vector of the solid line, and the direction and the largeness of the correction are shown by the vector of the dotted line. As shown in FIG. 15, the correction is conducted on the largeness of the difference (assumed to the correction value (1)) in the reverse direction to the direction on a*b* coordinate of the measurement value to the object color (T) (although, for simple description, L* coordinate is omitted, the correction of L* value is the same). The value of L*a*b* color space corrected in this manner, is made the object color, when the value of the color space of the color of the pixel a for each color of CMYK 1/2/3/4 order color, the ground color of the print sheet, and the value of the color space of the pixel b are found, it is assumed that the outputted value of L*a*b* color space is close to the object color (T).

Next, the color calculation means 15 finds the value of the color space of the color of the pixel a for each color of CMYK 1/2/3/4 order color, the ground color of the print sheet, and the value of the color space of the color of the pixel b, according to the flowchart shown in FIG. 12 by using the object color (correction 1) obtained by the correction, and accommodates them in the output color table (S44).

Further, the color channel calculation means 14 finds the combination of the output intensity for each color accommodated in the output color table 27, and regenerates the color channel table 22, and the image recording control means 13 controls the image recording section 3, and by using the color channel table 22, outputs the solid of CMYK 1/2/3/4 order color, the intermediate color, and re-measures the value of L*a*b* color space of each color including W as the third color tone (the value of the third color space) (S45).

As described above, the value of L*a*b* color space to be outputted, comes close to the object color (T), however, for further improving the accuracy of the color adjustment, the correction ratio calculation means 17 finds initially, the value of the color space of the color of the pixel a obtained by using the object color (correction 1) obtained by the correction, the ground color of the print sheet, and the value of the color space of the color of the pixel a obtained by using the object color (T) of the value of L*a*b* color space outputted by the value of the color space of the color of the pixel a, the ground color of the print sheet, and the moving amount (1)(the second difference) to the value of L*a*b* color space outputted by the value of the color space of the color of the pixel b. Then, the ratio of the moving amount (1) to the correction amount (1) is found as the correction ratio, and the object color correction means 16 further corrects the value of L*a*b* color space of respective colors of the object color table by the correction amount (made the correction amount (2)) in which the correction amount (1) is corrected by the correction ratio, and makes it the object color (correction 2) (S46).

Herein, when the moving amount to the correction amount (1) is the moving amount (1), and the moving amount to the correction amount (2) is the moving amount (2), when it is assumed that the correction ratio is kept, it follows that the moving amount (2)/correction amount (1)=the moving amount (2)/correction amount (2). That is, it follows that the correction amount (2)=(the correction amount (1)×the moving amount (2))/the moving amount (1). Herein, when the moving amount (2) is the correction amount (1), because it coincides with the object color (T), the correction amount (2) (correction amount (1)×correction amount (1))/the moving amount (1). Herein, when the correction amount (1) is d, the moving amount (1) is t, the above expression is expressed by the correction amount (2)=d×d/t, further, by using the correction ratio, t/d, it can be expressed as the correction amount (2)=d÷(t/d). That is, the correction amount (2) is a value corrected when the correction amount (1) is divided by the correction ratio.

Further, the color calculation means 15 finds, by using the object color (correction 2) obtained by the correction, the value of the color space of the color of the pixel a for each color of CMYK 1/2/3/4 order color, the ground color of the print sheet, and the value of the color space of the color of the pixel b, according to the flowchart shown in FIG. 12, and accommodates them in the output color table 27 (S47). In the present embodiment, by using the value of L*a*b* color space accommodated herein in the output color table 27, the image formation according to the following gradation image data is conducted, however, the correction of S46 may also be repeated again.

Returning again to FIG. 11, the color channel calculation means 14 finds the combination of CMY output intensity according to the reference table 23 from the value of L*a*b* color space of W accommodated in the output color table 27 obtained by using the object color (correction 2), the value of L*a*b* color space of the color of the pixel a of CMYK 1/2/3/4 order color, and the value of L*a*b* color space of the color of the pixel b of CMYK 1/2/3/4 order color, and generates the color channel table 22 (S15). As described above, as written in the specification of Japanese Patent Application O.P.I. No. 2004-274546 by the present applicant, from CMY→L*a*b* LUT, it finds L*a*b*→CMY LUT. Then, for the value of L*a*b* color space which finds the combination of CMY output intensity, from the input point of L*a*b*→CMY LUT, the output intensity of C, M, Y of 8 points in which L* 2 points (L1, L2), a* 2 points (a1, a2), b* 2 points (b1, b2) in the vicinity of the value of the L*a*b* color space are combined, and from the distance from each input point of L*a*b* each value of the value of the L*a*b* color space, it can find the combination of the output intensity of C, M, Y to the accommodated value of the L*a*b* color space.

Figure 13:
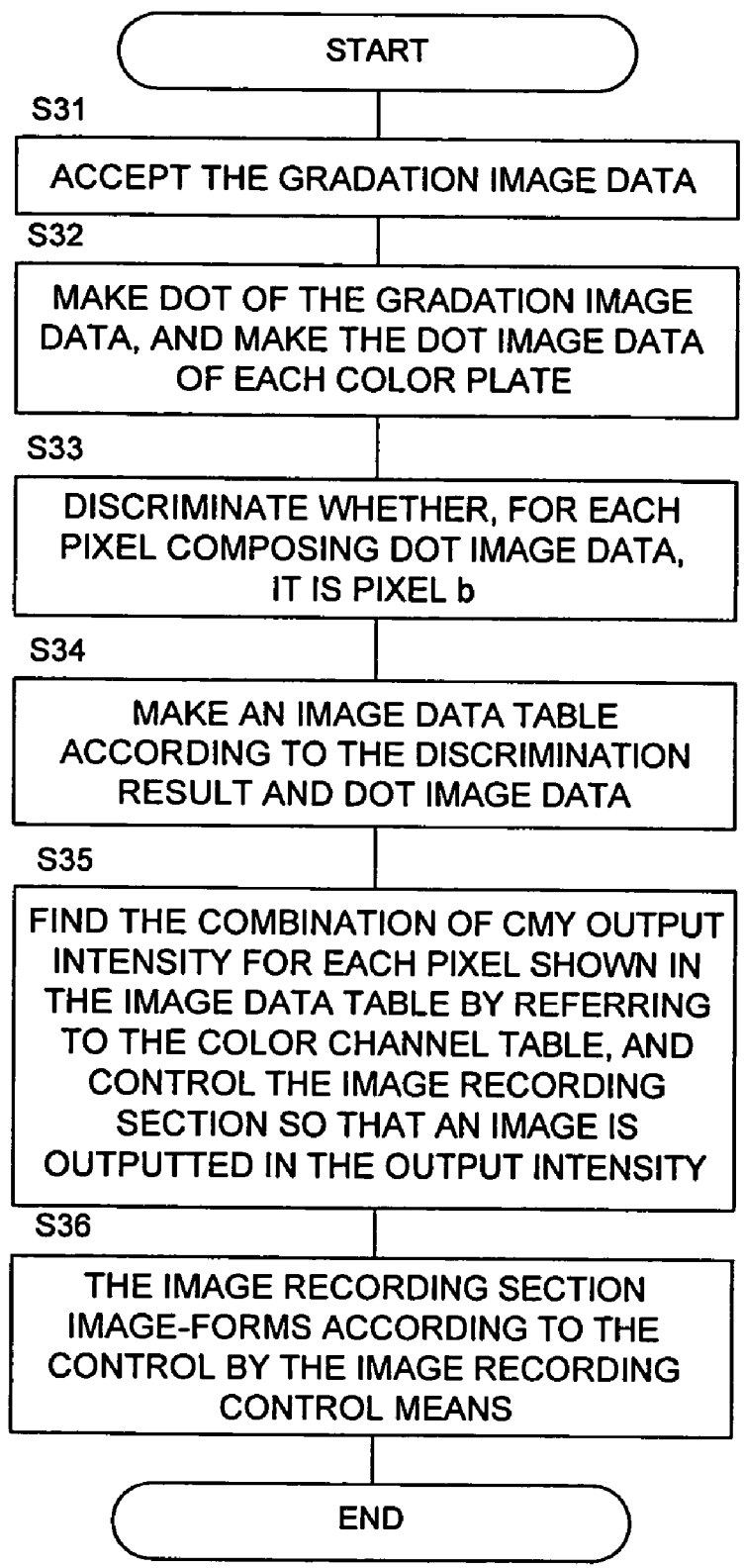
FIG. 13 is a flowchart showing an example of the sequence of the image formation conducted by the present color proof making apparatus.

Then, the image formation is conducted according to the gradation image data (S16). In FIG. 13, the flowchart showing an example of the sequence of the image formation which is conducted by the present color proof making apparatus is shown. In The image data interface means 5, the gradation image data is received (S31). Next, the screening means 11 conducts the screening of the gradation image data, and makes the dot image data of each color plate (S32). Then, for each pixel composing the dot image data of each color plate, the discrimination whether it is the pixel b is conducted by the image kind discrimination means 12 (S33), and according to the discrimination result and the dot image data, the image data table 26 is made (S34).

Then, the image recording control means 13 finds the combination of the output intensity of CMY by referring to the color channel table 22 from the discrimination result by the image kind discrimination means 12, and controls the image recording section 3 so that the image is outputted in the combination of the output intensity (S35). The image recording section 3 conducts the image formation according to its control (S36).

In the manner as described above, the color of the dot image section is composed. The color of the pixel of the color matched to the output color which is respectively the object, and the color whose color tone is different from the output color which is the object when it is composed of the pixel of the color whose color tone is different from the output color which is the object, can be found easily and accurately. Further, the color adjustment when the dot image is outputted according to the dot image data can be high accurately conducted.

Further, the above color calculation or color channel generation is conducted by using the information processing apparatus such as PC (Personal Computer), and its color calculation result or the color channel table is obtained by the color proof making apparatus through the medium such as floppy (trade mark) Disc, and can also be used for the formation of the color image.

Further, in the image output system composed of the image processing apparatus such as PC and the color proof making apparatus, the function by which the above color calculation or the color channel table is generated, is provided in the information processing apparatus such as PC, and its color calculation result or the color channel table is obtained by the color proof making apparatus through the interface, and can also be used for the formation of the color image.

What is claimed is:

1. A color adjustment method for controlling a color proof making apparatus comprising:
   a step for finding the first color difference between the second color space value showing the second color tone and the first color space value showing the first color tone when the first color tone is a target of color adjustment and the second color tone is a output of the target;

a step for finding the moved ratio of a predetermined correction amount added to the first color space value to a moved amount which is derived from the second color space value and the third color space value showing the third color tone when the third color tone is a output of the first color space value with the predetermined correction amount;

and, a step in which the first color space value is corrected with a amount obtained correcting the first color difference with the moved ratio, and the color adjustment is conducted based on the first color space value with the corrected amount, are included.

2. The color adjustment method of claim 1, wherein the step for finding the moved ratio includes:

a step for finding the second color difference between the second color space value showing the second color tone and the third color space value showing the third color tone, and the second color difference corresponds to the moved amount for deriving the moved ratio.

3. The color adjustment method of claim 2, wherein the predetermined correction amount is the first color difference.

4. A color adjustment method for controlling a color proof making apparatus by which each area of different color of dot image is formed of pixels of the first color and pixels of the second color whose color tone is different from the first color and the color adjustment is conducted adjusting the first color and the second color, and which is characterized in that:

a step in which an area ratio table showing the area ratios of the first and the second colors for the each area of different color in dot image and the recording medium for each intermediate color of color image is previously prepared;

a step in which the first color space values showing the first color tones of the solid and intermediate colors and the recording medium are obtained as target for color adjustment;

a step in which colors of all areas, the first and second color areas in each different color area of dot image and area of the recording medium, are adjusted with the first color space values of solid and intermediate colors and the recording medium, and the area ratio table;

a step in which the second color space values showing the second color tones of the solid and intermediate colors and the recording medium are obtained from output of the color adjustment;

a step in which the first color differences between the second color space values showing the second color tones and the first color space values showing the first color tones are obtained;

a step in which the third color space values showing the third color tones of the solid and intermediate colors and the recording medium are obtained from output of the first color space values with correction amounts derived from the first color differences;

a step in which the moved ratios of the correction amounts derived from the first color differences to moved amounts derived from the second color differences between second color space values and the third color space values are derived;

and, a step in which the first color space values are corrected with amounts obtained correcting the first color differences with the moved ratios, and colors of all areas, the first and second color areas in each different color areas of dot image and area of the recording medium, are adjusted with the corrected first color space values of solid and intermediate colors and the recording medium, and the area ratio table, are included.

5. The color adjustment method of claim 4, wherein the colors of all areas, the first and second color areas in each different color areas of dot image and area of the recording medium, are adjusted, in order to decrease the difference between the sum of all products of each area ratio from the area ratio table and color space value of the area and the corresponding first color space value with or without the correction.

6. The color adjustment method of claim 5, wherein the different color areas of dot image are made superimposing plural dot images of primary colors with different screen angles, and the each different color areas of dot image includes single color areas with one of the primary colors and superimposed colors with more than two of the primary colors.

7. The color adjustment method of claim 6, wherein the colors of all areas, the first and second color areas in the different color areas of dot image and area of the recording medium, are adjusted in the order that the second color areas are adjusted after adjusting the first color areas and the area of the recording medium.

8. The color adjustment method of claim 7, wherein the order of adjusting the second color areas is that the single color areas are adjusted first and the superimposed color areas are adjusted next in the order of the number of superimposed colors starting from two.

9. The color adjustment method of claim 8, wherein the adjustments of the superimposed color areas use the color space values of the second colors previously adjusted.

10. The color adjustment method of claim 4, wherein the color space values are values of the XYZ color space.

11. The color adjustment method of claim 4, wherein the pixels of the first color are arranged in the central part of the area of each different color area of dot image, and the pixels of the second color is arranged in the edge part of the area of each different color area of the dot image.

* * * * *